(12) United States Patent
Hjelmstad

(10) Patent No.: US 7,750,849 B2
(45) Date of Patent: Jul. 6, 2010

(54) METHOD AND ARRANGEMENT FOR DETERMINING THE SPATIAL FREQUENCY OF A SIGNAL

(75) Inventor: Jens Fredrik Hjelmstad, Lillestrøm (NO)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 186 days.

(21) Appl. No.: 11/569,010

(22) PCT Filed: Feb. 17, 2005

(86) PCT No.: PCT/NO2005/000059

§ 371 (c)(1), (2), (4) Date: Nov. 13, 2006

(87) PCT Pub. No.: WO2005/116686

PCT Pub. Date: Dec. 8, 2005

(65) Prior Publication Data

US 2007/0200760 A1    Aug. 30, 2007

(30) Foreign Application Priority Data

May 28, 2004 (NO) .................. 20042234
Dec. 30, 2004 (WO) .................. PCT/NO04/00409

(51) Int. Cl.
*G01S 5/02* (2010.01)
(52) U.S. Cl. ..................................... 342/417
(58) Field of Classification Search ............... 342/417, 342/446; 343/824, 825
See application file for complete search history.

(56) References Cited

U.S. PATENT DOCUMENTS

| 4,633,257 | A | 12/1986 | Apostolos |
| 5,339,284 | A | 8/1994 | Kaiser |
| 5,497,164 | A | 3/1996 | Croq |
| 5,834,709 | A | 11/1998 | Blonder |
| 6,470,192 | B1 * | 10/2002 | Karlsson et al. ............. 455/561 |
| 2008/0036676 | A1 * | 2/2008 | Puente Baliarda .......... 343/844 |

FOREIGN PATENT DOCUMENTS

| EP | 0395863 A | 11/1990 |
| WO | WO 03028156 A | 4/2003 |

OTHER PUBLICATIONS

Yan Lubin et al; "Wide-Band, Wide-Angle Microstrip Stacked-Patch_Element Phased Arrays"; IEEE Transactions on Antennas and Propagation, IEEE Inc New York, US vol. 39, No. 8 Aug. 1, 1991; pp. 1062-1070, XP000230605 ISSN 0018-926X p. 1062.

* cited by examiner

*Primary Examiner*—Thomas H Tarcza
*Assistant Examiner*—Nga X Nguyen
(74) *Attorney, Agent, or Firm*—Roger S. Burleigh (57) ABSTRACT

A method and arrangement for finding the direction to an emitter source by determining the spatial frequency of a signal received from the source in a sensor panel and comparing the spatial frequency with the instantaneous frequency. The panel includes a first matrix of sensors and a second matrix of sensors interleaved with the first matrix. The spatial frequency is determined by comparing the signals received by the first and second sensor matrices.

7 Claims, 7 Drawing Sheets

METHOD AND ARRANGEMENT FOR DETERMINING THE SPATIAL FREQUENCY OF A SIGNAL

FIELD OF THE INVENTION

The present invention relates to stacking of sensors and beam steering of sensor arrays in general, but find particular application in direction-finding systems and ESM systems.

TECHNICAL BACKGROUND

Radio frequency emitters (radars, satellite uplink stations, cell-phone base stations, relay links) can be detected, analysed, and geo-referenced from a remote observation platform. This is achieved using a sensor with an antenna system for detecting the radiation, connected to a receiver and processing system. These systems can be deployed from satellites, aircraft, UAVs, ships vehicles or mounted in masts.

Typical solutions employ radio receiver systems operating in the frequency bands 1 through 12 GHz. These systems employ multiple receiving antennas and multiple receivers to derive a course direction to the emitters.

In one method, the direction to the emitters is determined by comparing the phases of signals received in two or more antenna panels. However, it is well known that that the phase angle determined when comparing the signals from two receiving antennas will repeat itself at even intervals. This means that a given phase angle will not be conclusive as regards the direction to the emitter. To solve this ambiguity, prior art systems have included an omni-directional guard antenna in addition to the directive search antennas. The amplitude of the signal received by the guard antenna is compared with the signal amplitude from one of the search antennas in order to decide which angular direction in space that corresponds with a given phase angle.

Stacking by combining the signals from a number of element antennas are common in order to obtain an increase in antenna gain, to narrow the main antenna lobe or steer the direction of the main lobe. The increase in gain is a result of the narrowing of the lobe width. However, combining signals from individual element antennas tend to introduce some problems: The element antennas will easily interfere with each other and create an overall antenna diagram with so called grating lobes, which are side lobes with gain figures only slightly lower than in the main lobe. Grating lobes may be eliminated by using a very small distance between adjacent element antennas, but at the cost of a lower gain for a given number of element antennas. The signals from the individual element antennas are combined in combiners/splitters that introduce losses. A solution to this is to use separate access (amplifiers) to/from each element antenna, but at an increase in hardware costs. Thus, stacking of antennas introduces conflicting requirements between the desires of obtaining as large a gain as possible, obtaining a clean direction diagram and avoiding excessive hardware costs.

SUMMARY OF THE INVENTION

In its broadest scope, the claimed invention is directed to a method for determining the spatial frequency of a signal in a given plane intersected by the signal, wherein the plane includes a plurality of sensors arranged in arrays, the method including the steps of: sampling the signal with a first sensor array, the distance between adjacent sensors defining a first spatial sampling frequency, the first spatial sampling frequency being lower than the spatial frequency of the signal; sampling the signal with a second sensor array, the distance between adjacent sensors defining a second spatial sampling frequency lower than the first spatial sampling frequency, the first and second sensor arrays being interleaved; identifying a signal pair of corresponding signals of the signal sampled with the first sensor array with the signal sampled with the second sensor array, the signal pair being identified by detecting a high correlation factor between the corresponding signals; identifying a relative difference between the first spatial sampling frequency and the second spatial sampling frequency; determining a first spatial frequency shift factor based on the first spatial sampling frequency and the relative difference between the first spatial sampling frequency and the second spatial sampling frequency; and, up-converting the signal sampled with the first sensor array using the first spatial frequency shift factor to obtain the spatial frequency of the signal.

BRIEF DESCRIPTION OF THE DRAWINGS

The invention will now be described in detail in reference to the appended drawings, in which.

DETAILED DESCRIPTION OF THE INVENTION

The invention will be described in reference to a composite layered antenna panel as disclosed in International Patent Application PCT/NO2004/000407 with title "An antenna arrangement" filed by the present applicant, even though the invention may be applied to any type of antenna array.

Figure 1:
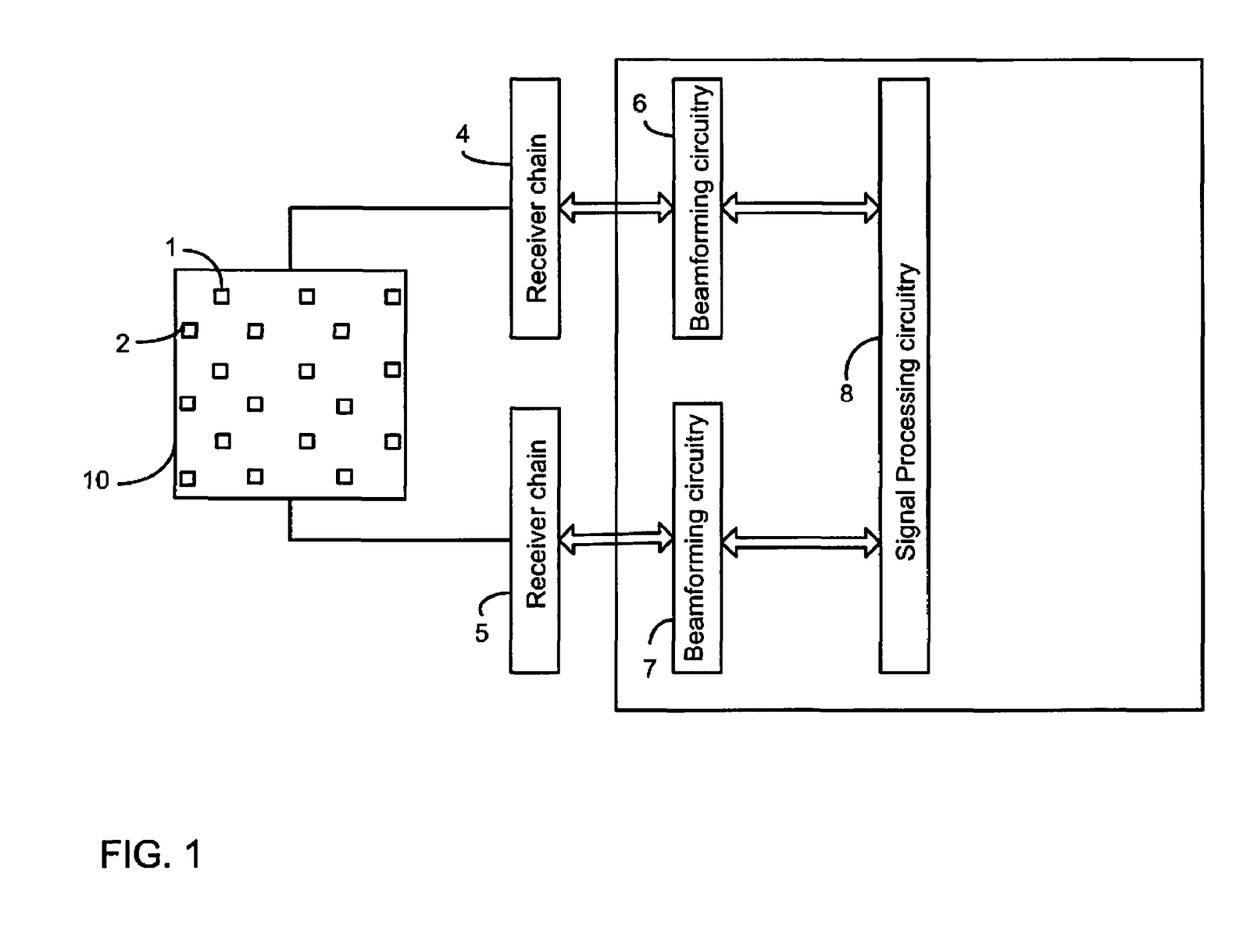
FIG. 1 is a schematic overview of a direction finder system employing the present invention.

FIG. 1 shows a direction finder system including an antenna panel 10. The antenna panel includes two set of patches 1, 2 organized in separate matrices. The signals picked up by each patch set are processed in separate receiver chains 4, 5. The receiver chains output digitized signals. Preferably, each receiver chain comprises separate receivers for each individual patch if economy and space permits. The digitized signals are combined in beamforming circuitry 6, 7. The signals from the patch sets 1, 2 are compared in signal processing circuitry 8 in order to determine the direction of arrival for a signal received by the antenna panel 10. The beamforming properties of the antenna is among other factors determined by the geometry of the patches in each matrix, but the signals from the two matrices may be combined in order to reduce adverse phenomena arising due to the stacking of the signals, and for determining the direction to a emitter source.

Figure 2:
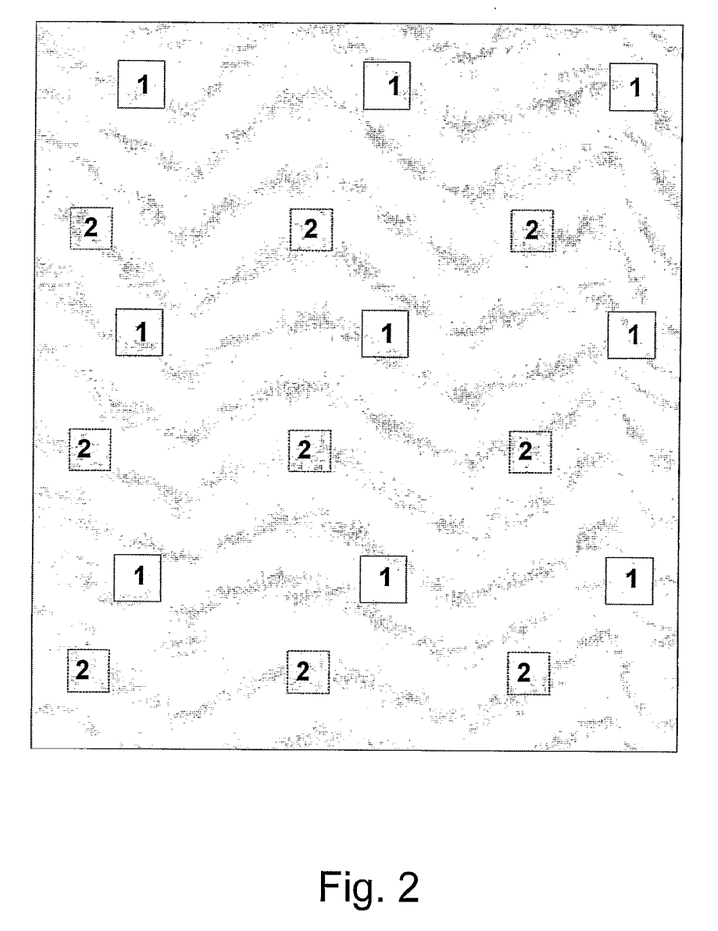
FIG. 2 shows an antenna panel with patches patterned according to the present invention.

The antenna panel shown in FIG. 2 is to be regarded as an example illustrating the principle of the invention. The panel includes nine patches 1 organized in a first matrix of 3×3 elements. Interleaved in this first matrix is a second matrix of nine patches 2, the patches 2 being located in open spaces between the patches 1. The patches 2 are also organized in a 3×3 matrix. The number of patches in each matrix is a matter of design, and the matrices is in the following designated as AXA' and BXB' matrices, respectively. A, B represents the number of patches in one row, while A', B' represents the number of patches in a column.

Figure 3:
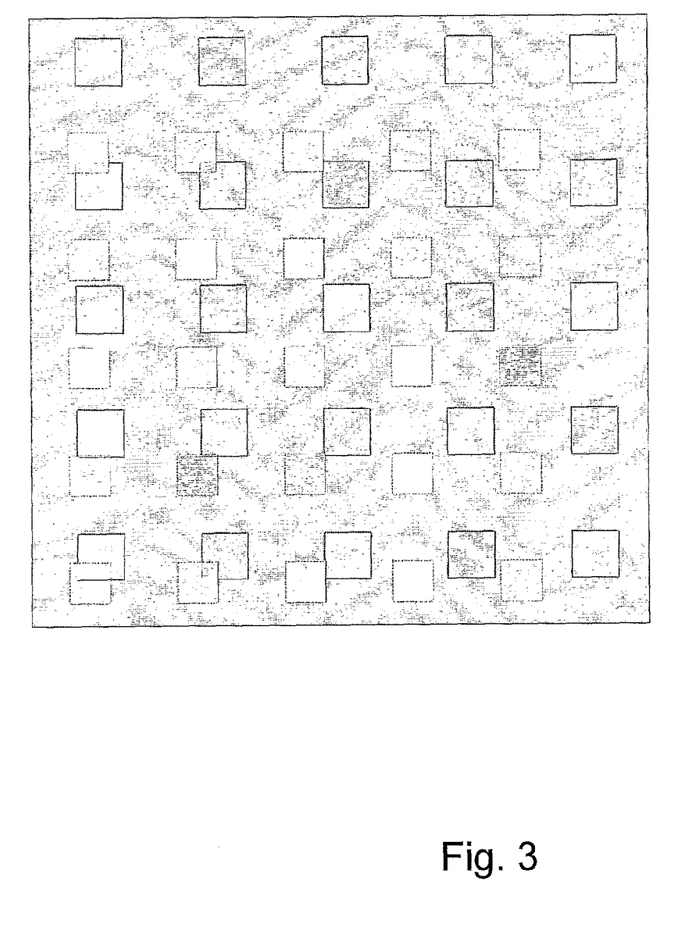
FIG. 3 shows an antenna panel with interfering patch patterns.

FIG. 3 shows a version of the inventive antenna panel with two 5×5 patch matrices. The patches in one of the sets are smaller than the patches in the second set. In this example some of the patches are interfering with patches from the other set. This problem can be solved by leaving the overlapping position empty, as the consequences of 10-20% missing patches in a matrix are negligible.

Figure 4:
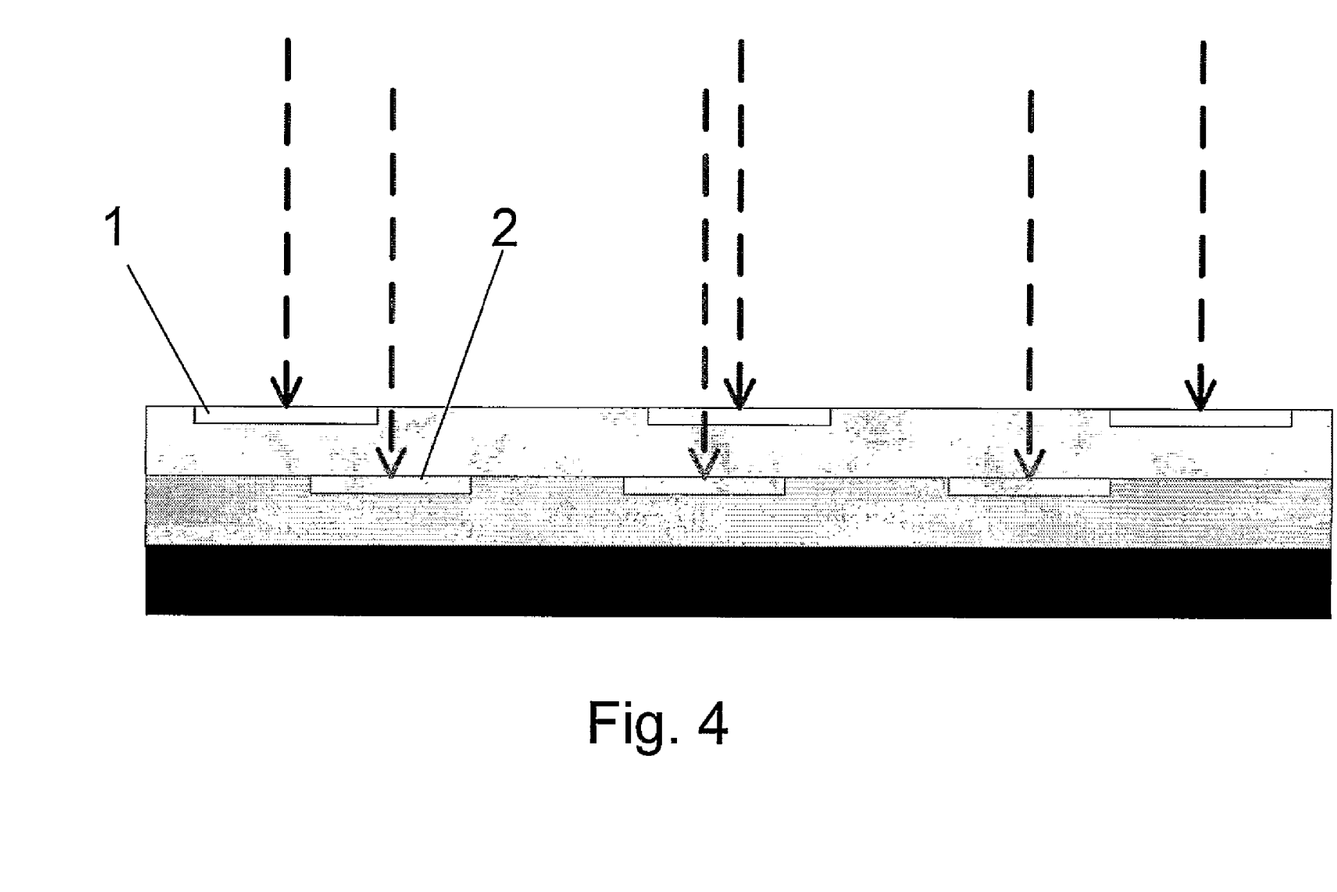
FIG. 4 shows an alternative antenna with patches arranged in several layers.

FIG. 4 shows an alternative solution to this problem using frequency selective surfaces to enable antenna patches to coincide in space. The top patches 1 are tuned to a different frequency than the patches 2 in the lower layer. The use of frequency selective patches will also enable separate and simultaneous processing of separate frequency components of a signal. For example is GSM using signalling at different frequencies, WiFi has multiple frequency bands, Bluetooth is a frequency hopping system, while radar signals may span a large range of frequencies.

Figure 5:
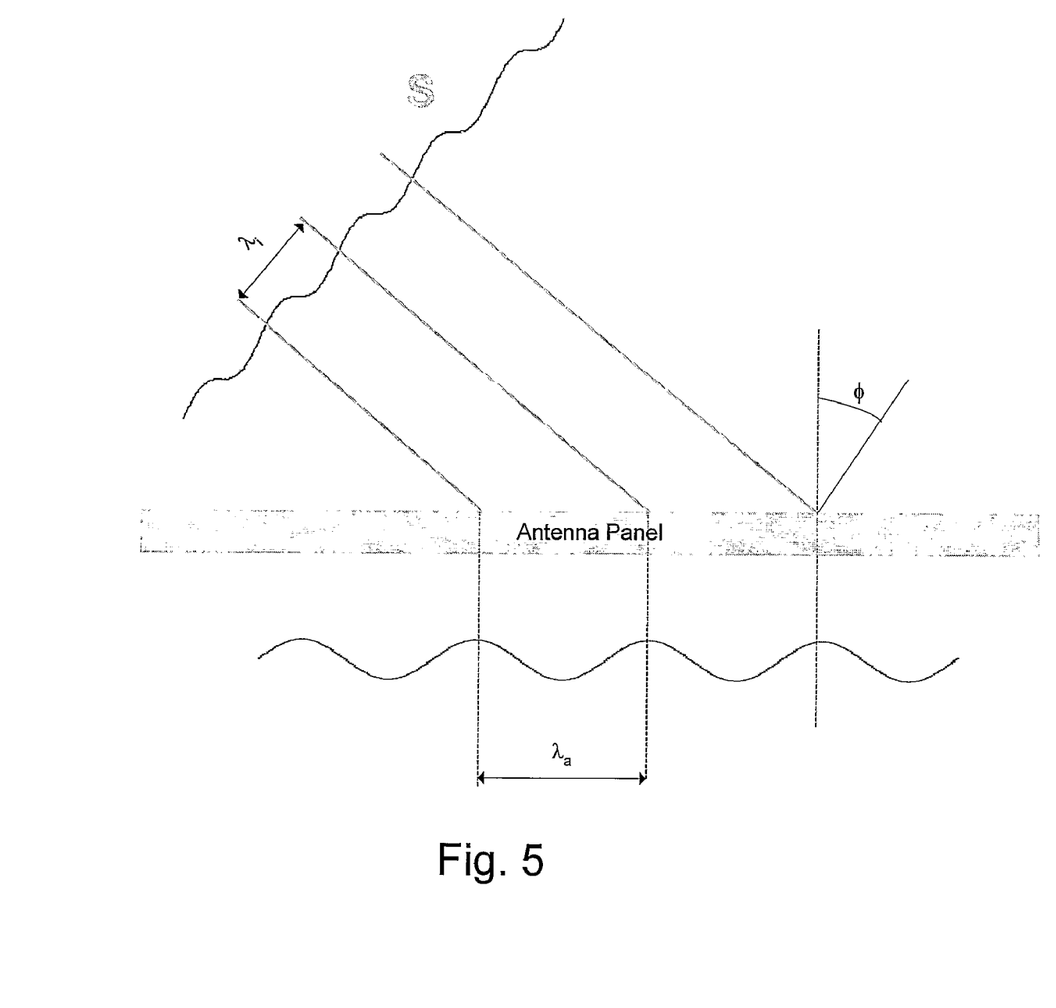
FIG. 5 shows a wavefront impinging on the panel of FIG. 2.

In FIG. 5 is shown a situation where a wave S from a remote transmitter is hitting the panel at an oblique angle φ. The incoming wave has a wavelength $\lambda_i$, but as the wave is hitting the panel at an angle, the wave will appear with a longer wavelength $\lambda_a$ in the plane of the panel. The apparent wavelength is related to the angle of arrival by the equation $\lambda_a = \lambda_i / \sin \phi$. It is easily seen that the apparent wavelength will be zero when the wave is hitting the panel head on, and be equal to the true wavelength in case the wave is hitting the panel from a direction in the plane of the panel. If the spatial frequency is known, the angle of incidence may be found by comparison with the real frequency, which is measured directly from the received signal.

In order to determine the spatial frequency, we use an approach as follows:

The approaching wave may be dissolved in a Fourier series of elemental sinus waves. To obtain an accurate picture of the wave, the wave should be sampled with spacing between individual sampling points no longer than half the wavelength of the highest frequency component in the signal. This is as predicted in Nyquist's theorem, expressed in spatial domain. However, due to the sparse matrices of patches, the signal in FIG. 5 is sampled only in isolated points spaced far apart, i.e. the wave is being under-sampled. However, from the two set of samples delivered by the two patch matrices, it is in fact possible to reconstruct the arriving wave. The method used for this reconstruction is illustrated in FIG. 6.

Figure 6:
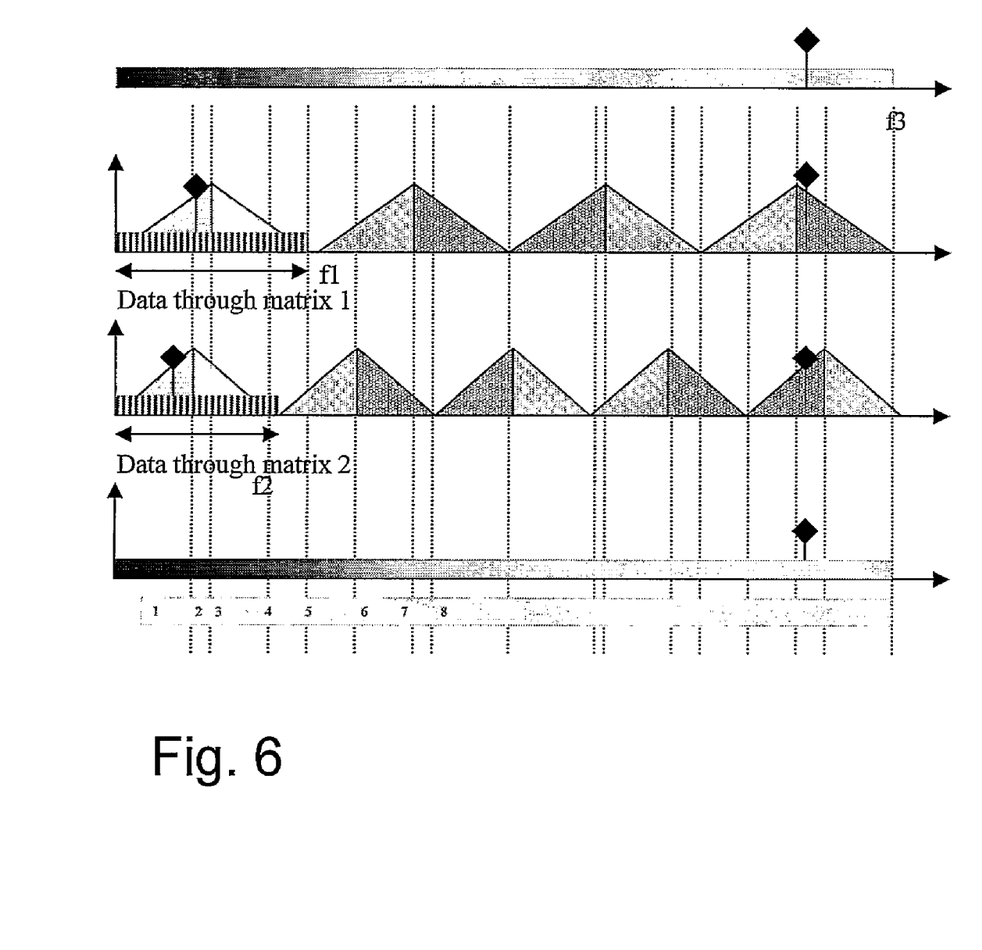
FIG. 6 shows the spatial relationship between the impinging wavefront and the signals detected by the panel.

FIG. 6 shows an incoming signal S with an apparent spatial frequency (periods/distance) $f_a$ of in the plane of the antenna panel. Due to the under-sampling, $f_a$ will be folded down into the pass-band of the respective patch matrix. The "pass-band" of a patch matrix is the range of spatial frequencies below the "sampling" frequency, i.e. wavelengths longer than the sample interval. The sample interval for each matrix defines "spatial sample frequencies" $f_1$ and $f_2$, respectively, of sample points per distance. The pass-bands of the patch matrices are represented by dark and lighter shaded triangles. The triangles are symmetrical about half the sampling (patch) spacing (i.e. the spatial Nyquist frequency). Folding occurs about multiples of the spatial Nyquist frequency. The lighter shaded triangles represent areas of negative spatial frequency.

If we had only one patch matrix, we could not know if the original signal was outside the matrix pass-band, and the folding ratio in relation to the sampled "folded" spatial frequency. However, by using two patch matrices, the spatial frequency of the signal may be reconstructed unambiguously.

The "reconstruction" process may be performed by first identifying the corresponding signals in the two channels (one channel for each matrix). Signal pairs are identified by detecting coincidence between the channels. Signals having a high correlation factor, e.g. over 0.9 over integration time $1/f_3$, are considered as valid pairs, while signals with lower correlation factor are muted. $f_3$ is the multiple of the spatial sampling frequencies $f_1$ and $f_2$. The two spatial frequencies of a given signal pair, i.e. the absolute spatial frequency values, and the relative difference between the spatial frequencies, will hold information identifying the correct factor to use when up-converting the signal back to its correct spatial frequency. The spectrum is divided into separate spatial frequency bands 1, 2, 3 . . . , as shown in the figure. In each of these bands there is a specific relationship between spatial frequencies in the first and second matrices, and we may apply rules for the reconstruction of the signal $f_a$. The spatial frequency shift factor n is given by the relationships:

$$f_{r1} = (f_a - nf_1), \quad n = 0, 1, 2, 3 \ldots$$

$$f_{r2} = (f_a - mf_2), \quad m = \left\{ \begin{array}{c} n \\ n+1 \end{array} \right\}$$

Where $f_a$ is the spatial frequency of the incoming signal, $f_1$ is the spatial sampling frequency of patch matrix 1, $f_2$ is the spatial sampling frequency of patch matrix 2, $f_{r1}$ is the folded spatial frequency of the incoming signal registered by patch matrix 1 and $f_{r2}$ is the folded spatial frequency registered by patch matrix 2.

The value of n is dependent on in which bands $f_{r1}$ and $f_{r2}$ are falling. In the example shown in FIG. 6, we only need to consider two cases: If the apparent signal falls within the lower dark shaded triangles of both channels, i.e. both $f_{r1}$ and $f_{r2}$ is within band 1, then m=n. The other case is when one of the apparent signals falls in band 1 and the other falls in band 2. Then m=n+1. This is as shown in FIG. 6. Other cases do not apply.

Thus, the signal in patch matrix 1 is up-converted using a known spatial frequency shift factor n, while the signal in patch matrix 2 is up-converted using a known and possibly different spatial frequency shift factor m. When the signals have been up-converted, the signals from patch matrix 1 and patch matrix 2 are added. Alternatively, only the signal in one of the matrices is up-converted. However, by using both signals, an improved signal-to-noise ratio is obtained.

By comparing the full (bulk) signals obtained from each matrix, the angle between the incoming ray and the antenna panel is determined. This angle is not a complete indication of the direction of incident. In order to obtain complete direction information in angles of azimuth and elevation, the signals from each row and column in the panel must be observed independently, with the method described above. The angles determined for the rows may be averaged to get a direction angle in the horizontal plane (azimuth), and the angles determined for the columns may be averaged to get an angle in the vertical plane (elevation). Other methods of summation may be used instead of averaging.

Figure 7:
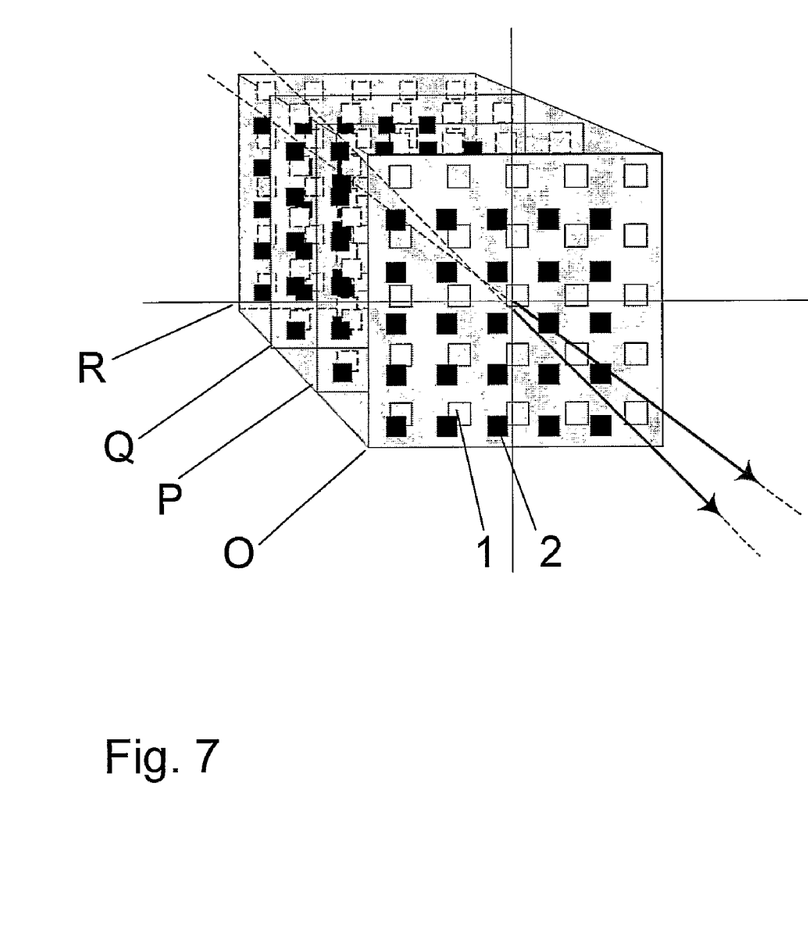
FIG. 7 shows another embodiment of the invention, featuring a 3-D antenna arrangement.

FIG. 7 illustrates an embodiment of the invention with several antenna panels O, P, Q, R stacked behind each other. This solution is rather more complex than the previous embodiment, but the information provided by the extra panels offer an additional degree of freedom. By comparing the phases between signals received by corresponding patches in each panel, a measure of the instantaneous frequencies of incoming waves is obtained. This method of determining the real or instantaneous frequency has some advantages over conventional measurements on the signal in the receiver channels, as it is easier to differentiate between received pulses that are overlapping in time. It is also possible to compare the bulk signals from two of the panels and dervide precise direction information.

By this inventive method, the spatial frequency and wavelength of an incoming wave may be determined as if the wave had been sampled with a very dense matrix of sampling points. This also means that the patch panel will act as if it contained a large number of densely packed patched. In particular, the panel has an apparent density of patches equal to the multiple of the spatial frequencies of the first and second patch matrices. This apparent dense matrix of patches means that any grid lobes will be eliminated. There will be a correspondent increase in gain. The hardware count will be low compared to the apparent matrix which is simulated.

While the invention has been described in relation to a direction-finder system with patch panels, it has a much wider application. It may be used in any receiving system which stacks the signals from a number of elemental antennas, be it patch antennas, Yagi antennas or any type of antenna and on any frequency. In a GSM system, it may be used for direction finding from base stations replacing present technologies based on triangulation or propagation time. The inventive system will offer a more accurate determination of the direction to a mobile station. Another application is in WiFi wireless networks inside buildings. It may then be used for finding missing objects, e.g. mobile phones. The invention may also be used in transmitting systems, both for beam forming and beam steering. The invention may also find applications outside the field of radio, such as in medical imaging or seismic prospecting using acoustic waves. It may even find application in optics.

The invention claimed is:

1. A method for determining the spatial frequency of a signal in a given plane intersected by said signal, said plane including a plurality of sensors arranged in arrays, the method comprising the steps of:
    sampling said signal with a first sensor array, the distance between adjacent sensors defining a first spatial sampling frequency, the first spatial sampling frequency being lower than the spatial frequency of the signal;
    sampling said signal with a second sensor array, the distance between adjacent sensors defining a second spatial sampling frequency lower than said first spatial sampling frequency, said first and second sensor arrays being interleaved;
    identifying a signal pair of corresponding signals of the signal sampled with the first sensor array with the signal sampled with the second sensor array, the signal pair being identified by detecting a high correlation factor between the corresponding signals;
    identifying a relative difference between the first spatial sampling frequency and the second spatial sampling frequency;
    determining a first spatial frequency shift factor based on the first spatial sampling frequency and the relative difference between the first spatial sampling frequency and the second spatial sampling frequency; and,
    up-converting the signal sampled with the first sensor array using the first spatial frequency shift factor to obtain the spatial frequency of said signal.

2. The method according to claim 1, further comprising the steps of:
    determining a second spatial frequency shift factor based on the second spatial sampling frequency and the relative difference between the first spatial sampling frequency and the second spatial sampling frequency;
    up-converting the signal sampled with the second sensor array using the second spatial frequency shift factor and,
    adding the up-converted signal sampled with the first sensor array to the up-converted signal sampled with the second sensor array.

3. The method according to claim 1, further comprising the step of retaining signals with a high correlation figure and muting signals with a lower correlation figure.

4. The method according to claim 1, further comprising the step of filtering said signal with an anti-aliasing filter before it is sampled, said anti-aliasing filter having a cut-off frequency equal to the multiple of said first and second spatial sampling frequencies.

5. The method according to claim 1, further comprising the step of determining a direction to a source emitting a signal, by determining the spatial frequency of said signal received by first and a second interleaved sensor arrays in a plane containing said sensors arrays and comparing the spatial frequency with an instantaneous frequency of the signal.

6. The method according to claim 1 further comprising the step of determining a direction to a source emitting a signal, the sensors in said first array being arranged in rows and columns defining a first matrix,
    wherein the sensors in said second array are arranged in rows and columns defining a second matrix,
    by determining the spatial frequency of the signal detected in a row, comparing said spatial frequency with an instantaneous frequency of said signal and determining an azimuth angle for the incoming signal,
    by determining the spatial frequency of the signal detected in a column, comparing said spatial frequency with the instantaneous frequency of said signal and determining an elevation angle for the incoming signal.

7. The method according to claim 1, wherein the steps of sampling said signal with a first sensor array and sampling said signal with a second sensor array are simultaneously and separately processed.

* * * * *

UNITED STATES PATENT AND TRADEMARK OFFICE
CERTIFICATE OF CORRECTION

PATENT NO. : 7,750,849 B2  Page 1 of 1
APPLICATION NO. : 11/569010
DATED : July 6, 2010
INVENTOR(S) : Hjelmstad It is certified that error appears in the above-identified patent and that said Letters Patent is hereby corrected as shown below:

In Column 5, Line 6, delete "dervide" and insert -- derive --, therefor.

In Column 6, Line 36, in Claim 6, delete "1" and insert -- 1, --, therefor.

Signed and Sealed this

Nineteenth Day of October, 2010

David J. Kappos
*Director of the United States Patent and Trademark Office*